United States Patent
Van Wageningen

(10) Patent No.: US 11,742,949 B2
(45) Date of Patent: Aug. 29, 2023

(54) POWER SAVING FOR AN OPTICAL WIRELESS COMMUNICATION SYSTEM

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/922,358

(22) PCT Filed: May 3, 2021

(86) PCT No.: PCT/EP2021/061564
§ 371 (c)(1),
(2) Date: Oct. 29, 2022

(87) PCT Pub. No.: WO2021/224180
PCT Pub. Date: Nov. 11, 2021

(65) Prior Publication Data
US 2023/0179299 A1 Jun. 8, 2023

(30) Foreign Application Priority Data
May 8, 2020 (EP) ..................... 20173682

(51) Int. Cl.
*H04B 10/00* (2013.01)
*H04B 10/116* (2013.01)
*H04B 10/293* (2013.01)

(52) U.S. Cl.
CPC ....... *H04B 10/116* (2013.01); *H04B 10/2939* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,128,792 | A | * | 7/1992 | Teich | H04B 10/1141 398/154 |
| 5,321,542 | A | * | 6/1994 | Freitas | H04B 10/1149 398/103 |
| 5,600,471 | A | * | 2/1997 | Hirohashi | H04B 10/11 398/32 |
| 5,677,909 | A | * | 10/1997 | Heide | H04B 10/1125 370/347 |

(Continued)

FOREIGN PATENT DOCUMENTS

| | | |
|---|---|---|
| WO | 1996031021 A1 | 10/1996 |
| WO | 2020019905 A1 | 1/2020 |

OTHER PUBLICATIONS

Dawson Ladislaus Msongaleli, et al., "Adaptive Polling Medium Access Control Protocol for Optic Wireless Networks", Applied Sciences, 2019, 9, 1071, pp. 1-15.

(Continued)

*Primary Examiner* — Agustin Bello

(57) ABSTRACT

Power saving is achieved in an optical wireless communication (VLC/LiFi) system by using a polling-based medium access control (MAC) scheme, wherein an access point can use a silent period when no one is polled (and EPs can thus sleep). When transmission queues are empty, the access point may apply the silent period which may be based on a minimum polling interval announced by broadcast.

15 Claims, 3 Drawing Sheets

(56) References Cited

U.S. PATENT DOCUMENTS

| | | | | |
|---|---|---|---|---|
| 5,724,168 | A * | 3/1998 | Oschmann | H04B 10/40 398/127 |
| 5,838,472 | A * | 11/1998 | Welch | H04B 10/40 398/127 |
| 5,880,868 | A * | 3/1999 | Mahany | H04B 10/40 398/115 |
| 6,141,128 | A * | 10/2000 | Korevaar | H04B 10/40 398/1 |
| 6,442,145 | B1 * | 8/2002 | De Lange | H04L 1/0003 370/204 |
| 6,650,451 | B1 * | 11/2003 | Byers | H04B 10/1125 398/158 |
| 7,570,612 | B1 * | 8/2009 | Loc | H04W 74/06 370/332 |
| 7,822,349 | B2 * | 10/2010 | Roosli | H03G 3/3084 398/127 |
| 10,491,309 | B1 * | 11/2019 | Rao | H04B 10/80 |
| 2002/0160729 | A1 * | 10/2002 | Patterson | G07F 13/025 455/45 |
| 2005/0117912 | A1 * | 6/2005 | Patterson | G07F 9/001 398/135 |
| 2005/0200452 | A1 * | 9/2005 | Ikeda | G08B 1/08 340/3.7 |
| 2006/0034611 | A1 * | 2/2006 | Li | G06F 1/3215 398/135 |
| 2006/0039345 | A1 | 2/2006 | Perez-Costa | |
| 2007/0230394 | A1 * | 10/2007 | Wang | H04W 72/21 370/328 |
| 2008/0261663 | A1 | 10/2008 | Park et al. | |
| 2010/0214942 | A1 * | 8/2010 | Du | H04W 52/0229 370/252 |
| 2011/0052210 | A1 * | 3/2011 | Riedl | G08C 23/04 398/189 |
| 2011/0069649 | A1 | 3/2011 | Gobriel et al. | |
| 2011/0069965 | A1 * | 3/2011 | Kim | H04B 10/1149 398/118 |
| 2013/0188601 | A1 * | 7/2013 | Sun | H04L 45/3065 370/331 |
| 2013/0266325 | A1 * | 10/2013 | Giustiniano | H04B 10/116 398/130 |
| 2014/0010550 | A1 * | 1/2014 | Bahr | H04B 10/116 398/127 |
| 2014/0270796 | A1 * | 9/2014 | Jovicic | H04B 10/1141 398/128 |
| 2015/0171968 | A1 * | 6/2015 | Featherston | H04B 10/1123 398/118 |
| 2015/0304046 | A1 * | 10/2015 | Kramer | H04B 10/40 398/66 |
| 2016/0182154 | A1 * | 6/2016 | Fang | H04B 10/2575 398/116 |
| 2016/0359558 | A1 * | 12/2016 | Baggen | H04N 23/73 |
| 2017/0047998 | A1 * | 2/2017 | Palanisamy | H04W 88/085 |
| 2017/0302379 | A1 * | 10/2017 | Bernard | H04L 12/2865 |
| 2018/0288852 | A1 * | 10/2018 | Davies | H04B 10/54 |
| 2018/0343066 | A1 * | 11/2018 | Caplan | H04B 10/677 |
| 2019/0028192 | A1 * | 1/2019 | Tsonev | H04W 56/0005 |
| 2020/0053851 | A1 * | 2/2020 | De Wilde | H05B 47/19 |
| 2020/0177279 | A1 * | 6/2020 | Kikuchi | H04B 10/116 |
| 2020/0208788 | A1 * | 7/2020 | Tran | F21V 29/71 |
| 2020/0382212 | A1 * | 12/2020 | Engelen | H05B 47/195 |
| 2021/0168795 | A1 * | 6/2021 | Yang | H04L 5/0048 |
| 2021/0273729 | A1 * | 9/2021 | Linnartz | H04B 10/502 |
| 2022/0078806 | A1 * | 3/2022 | Sevindik | H04W 72/12 |
| 2022/0150831 | A1 * | 5/2022 | Di Marco | H04W 4/80 |
| 2022/0232423 | A1 * | 7/2022 | Thyagaturu | H04W 28/08 |
| 2022/0337316 | A1 * | 10/2022 | Croughwell, III | G06F 13/4282 |

OTHER PUBLICATIONS

Dawson Ladislaus Msongaleli, et al., "Dynamic Future Knowledge Maximum Transmission Unit (DFK-MTU) for Optic Wireless Networks", IEEE, 2018, pp. 1-4.

* cited by examiner

POWER SAVING FOR AN OPTICAL WIRELESS COMMUNICATION SYSTEM

CROSS-REFERENCE TO PRIOR APPLICATIONS

This application is the U.S. National Phase application under 35 U.S.C. § 371 of International Application No. PCT/EP2021/061564, filed on May 3, 2021, which claims the benefit of European Patent Application No. 20173682.4, filed on May 8, 2020. These applications are hereby incorporated by reference herein.

FIELD OF THE INVENTION

The invention relates to the field of communication in optical wireless networks, such as—but not limited to—Li-Fi networks, for use in various different applications for home, office, retail, hospitality and industry.

BACKGROUND OF THE INVENTION

The concept of polling in wireless communication is known for example from US2011/069649 A1, which discloses a method for power control in a wireless station operating in a wireless local area network (WLAN) under access point control, in accordance with the IEEE 802.11 standard, that involves adjusting a snooze interval for the station as a function of communication traffic characteristics, data rate, jitter and/or throughput.

Wireless optical networks, such as Li-Fi networks (named like Wi-Fi networks), enable mobile user devices (called end points (EP) in the following) like laptops, tablets, smartphones or the like to connect wirelessly to the internet. Wi-Fi achieves this using radio frequencies, but Li-Fi achieves this using the light spectrum which can enable unprecedented data transfer speed and bandwidth. Furthermore, it can be used in areas susceptible to electromagnetic interference. It's important to consider that wireless data is required for more than just our traditional connected devices—today televisions, speakers, headphones, printer's, virtual reality (VR) goggles and even refrigerators use wireless data to connect and perform essential communications. Radio frequency (RF) technology like Wi-Fi is running out of spectrum to support this digital revolution and Li-Fi can help power the next generation of immersive connectivity.

Based on the modulations, the information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

A communication signal can be embedded in a light signal emitted by an illumination source of an access device, such as an everyday luminaire, e.g. room lighting or outdoor lighting, thus allowing use of the illumination from the luminaires as a carrier of information. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

It should however be noted that such communication signals may also utilize light signals outside the visible spectrum. Outside the visible spectrum in particular the infrared or ultraviolet range are interesting candidates as these are not visible and thus do not cause visible artefacts; which may be particularly relevant for transmissions originating from handheld devices.

In the following, the term "access point" is used to designate a logical access device that can be connected to one or more physical access devices (e.g. transceivers). Such a physical access device may typically be located at a luminaire and the logical access point may be connected to one or more physical access devices each located at one or more luminaires.

International patent application WO1996/031021 A1 discloses the use of a hybrid optical/radio wireless communication system, that comprises an infrared backbone having a radio frequency backup channel. The access points forming the infrared backbone are generally located on a ceiling in a hallway of a building. Hub access points may communicate data over the backbone, by polling other hub access points using modulated infrared light. If infrared communications fail, the hub access points may, as a backup, communicate in the same fashion using low power radio frequency (RF) transmissions. The hub access points may operate as a polling device or as a polled device.

In an optical wireless network containing many access points, each having a relatively small coverage area, the power consumption of the access points needs to be minimized.

When applying a deterministic schedule (such as time division multiple access (TDMA)), power savings can be well organized by activating and deactivating transmitters based on such a schedule. With TDMA, a scheduling of time slots can be based on the required interval time for each transmission link. With this approach a user device (endpoint) can determine when it can sleep, and an access point can determine at which slots no data transfer is scheduled in order to save power. However, such a deterministic scheduling of time slots may lead to allocating time slots to endpoints that do not have anything to send, which may result in un-used timeslots. Moreover, if an endpoint has something to send during the interval time in which the access point has not allocated any time slot to this endpoint, it must wait. Thus, deterministic schedules can suffer from non-optimized throughput (e.g. by allocation of timeslots that are not utilized), increased latency (e.g. when timeslots are insufficiently allocated to prevent bad utilization), and inflexibility to react on changing transmission needs.

SUMMARY OF THE INVENTION

It is an object of the present invention to provide a method to reduce the power consumption of an access point while maintaining a high performance.

This object is achieved by an access point as claimed in claim 1, by an access point assembly as claimed in claim 8, by an optical wireless communication system as claimed in claim 9, by a method as claimed in claim 13, and by a computer program product as claimed in claim 15.

According to a first aspect, an apparatus for controlling communication in an optical wireless communication network via adaptive polling medium access control is provided, wherein the apparatus is configured to poll associated endpoints of the communication network for initiating a data exchange, to receive from the associated endpoints information about a remaining transmission queue length at the end of the data exchange, and to apply a silent period in response to the status of transmission queues of associated endpoints.

Accordingly, by applying adaptive polling, throughput and latency can be optimized, while still saving power due to the intermittently applied silent periods. Thereby, both improved throughput and/or latency can be achieved. The proposed polling mode with conditionally reserved silent periods ensures that latency requirements can still be fulfilled.

According to a second aspect, a method of controlling polling-based communication in an optical wireless communication network is provided, wherein the method comprises:

polling associated endpoints of the communication network to initiate a data exchange;

receiving from the associated endpoints information indicating a remaining transmission queue length at the end of the data exchange; and applying a silent period based on the status of transmission queues of associated endpoints.

According to a first option of the first or second aspect, a restriction message may be received from a network controller indicating at least one of at least one specific time channel for communicating with the associated endpoints and a restriction as to when to communicate with which endpoint and when not. Thereby, interference problems among neighboring endpoints can be reduced by preventing collisions.

According to a second option of the first or second aspect, which may be combined with the first option, the silent period may be determined to be smaller than or equal to a smallest polling interval of the associated endpoints. This ensures that each associated endpoint can be served after the silent period according to its polling interval without suffering from increased latency.

According to a third option of the first or second aspect, which may be combined with the first or second option, a silent time may be determined for each of the associated endpoints by subtracting a next possible time that the associated endpoint can be polled from a time it needs to be polled, wherein the time it needs to be polled corresponds to a negotiated polling interval minus the last polling time for the associated endpoint, and wherein the apparatus is configured to determine the silent period so as to be smaller than or equal to the minimum of the silent times for all associated endpoints. Thereby, the duration of the silent period can be adapted to the individual silent times of all associated endpoints.

According to a fourth option of the first or second aspect, which may be combined with any one of the first to third options, a frame may be broadcast at the start of the silent period, which may indicate the duration of the silent period. Thereby, the associated endpoints are informed about the silent period and its duration and can switch off their transceivers to save power.

According to a fifth option of the first or second aspect, which may be combined with any one of the first to fourth options, a time to serve may be determined for each requesting endpoint depending on the transmission queue length of each associated endpoint. This measure ensures that the remaining amount of data in the transmission queues is considered in the polling schedule to ensure fair scheduling and reduced latency.

According to a sixth option of the first or second aspect, which can be combined with any one of the first to fifth options, an information about the remaining transmission queue length may be received from the associated endpoints for each of a plurality of priority levels. Thereby, individual quality requirements or other parameters that demand prioritized transmission can be considered in the polling schedule.

According to a third aspect, an access point for providing access to an optical wireless communication system is provided, the access point comprising an apparatus according to the first aspect.

According to a fourth aspect, an access point assembly for providing access to an optical wireless communication system is provided, the access point assembly comprising an access point according to the third aspect and at least one optical transceiver coupled thereto to transmit an optical downlink communication signal and to receive an optical uplink communication signal.

The access point assembly of the fourth aspect may for example be integrated within a luminaire. Optionally the access point assembly may comprise multiple transceivers which is particularly advantageous when the access point is capable of MISO (multiple receivers, single transmitter) or MIMO (multiple receivers, multiple outputs) optical wireless communication. Alternatively, the transceivers may be housed separately from the access point and may be coupled using an electrical or optical link.

Also, a luminaire for an illumination system is provided, the luminaire comprising at least one transceiver of an access point according to the third aspect or an access point assembly according to the fourth aspect.

According to a fifth aspect, an optical wireless communication system is provided, that comprises an access point according to the third aspect and at least one endpoint for communicating via adaptive polling medium access control.

According to a first option of the fifth aspect, which can be combined with any one of the above options of the first or second aspect, the endpoint may be configured to turn on its transmitter when it is polled only. Thereby, power can be saved and even increased by the insertion of the proposed silent periods.

According to a second option of the fifth aspect, which can be combined with the above first option of the fifth aspect or any one of the above options of the first or second aspect, the endpoint may be configured to negotiate a polling interval with the access point based on its required latency. This measure ensures that the required latency of the endpoint is considered in the polling schedule while still achieving power saving due to the inserted silent periods.

Alternative solutions other than negotiation are envisaged whereby end points may share information for determining the smallest polling interval. Negotiation may involve endpoint devices sharing information such as a desired polling interval/its latency requirement(s) with the access point. The access point may then determine the smallest polling interval for the associated endpoints based thereon.

The polling interval(s)/latency requirement(s) may for example be shared by the end points with the access point upon association with the access point. This may be advantageous when the nature of the end-point device (e.g. security camera), or the traffic generated by the end point, has fixed and strict latency requirements.

Alternatively, endpoint devices may proactively share (push) their desired polling interval(s)/latency requirement(s) with the access point, e.g. when the endpoint notes that it has egress packets with high priority, at which point a shorter latency may be called for. In particular for multifunctional devices, the nature of traffic being generated and the corresponding requirements may vary over time which may call for more frequent sharing.

More alternatively the desired polling interval(s)/latency requirement(s) may be retrieved from the end point by the access point (pull) intermittently, e.g. when using a round robin approach at every access together with the queue length information. Upon receipt the access point may then determine a silent period accordingly.

According to a third option of the fifth aspect, which may be combined with the first or second option of the fifth aspect or any one of the above options of the first or second aspect, the endpoint may be configured to negotiate individual polling intervals per priority for different communication priority levels. Thereby, individual quality requirements or other parameters that demand prioritized transmission can be considered in the polling schedule.

According to a sixth aspect, a computer program product may be provided, which comprises code means for producing the steps of the above method of the second aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the access point of claim 1, the access point assembly of claim 8, the OWC system of claim 9, the method of claim 13, and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described based on an optical multi-cell illumination and communication (LiFi) system.

Throughout the following, a luminaire as an access point is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics based with the light source coupling in light in the fiber core or "light pipe" and coupling out the light at the other end.

Figure 1:
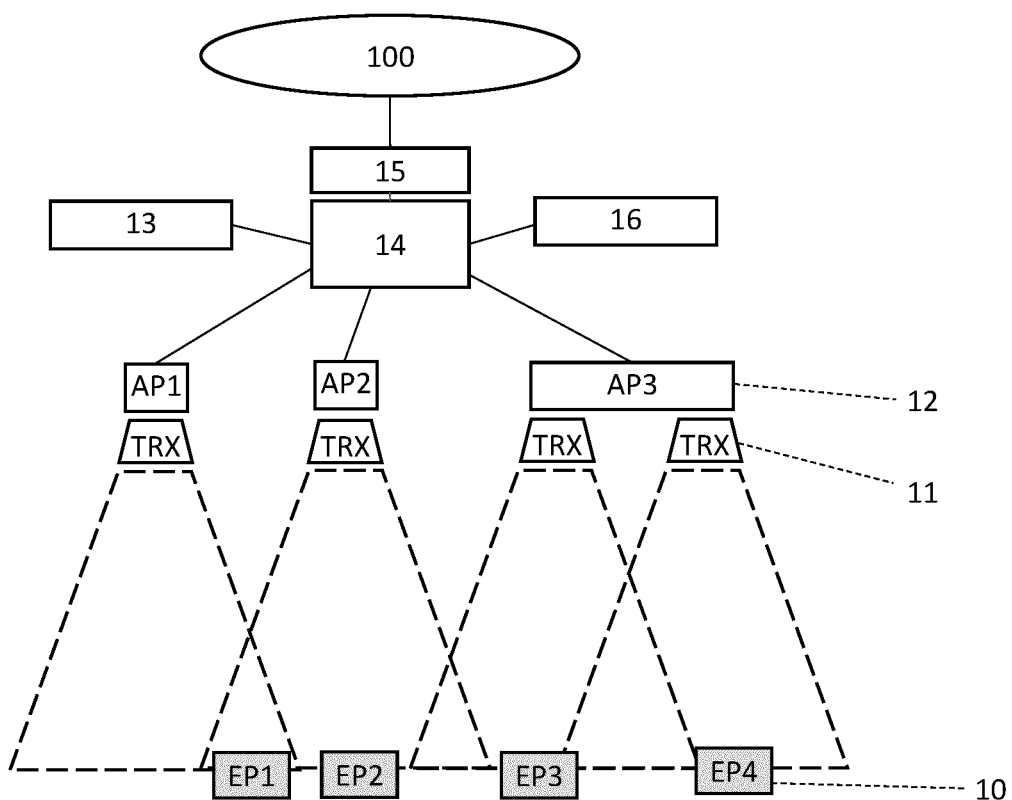
FIG. 1 shows schematically a block diagram of a LiFi network in which various embodiments can be implemented.

FIG. 1 shows schematically a block diagram of a LiFi network in which various embodiments can be implemented.

It is noted that—throughout the present disclosure—the structure and/or function of blocks with identical reference numbers that have been described before are not described again, unless an additional specific functionality is involved. Moreover, only those structural elements and functions are shown, which are useful to understand the embodiments. Other structural elements and functions are omitted for brevity reasons.

The LiFi network comprises multiple access-points (APs) AP1 to AP3 12, e.g. luminaires of a lighting system, connected via a switch (e.g. an Ethernet switch) 14, whereby each AP 12 controls one, or multiple transceivers (TRX) 11 (i.e. combined transmitters (optical emitters) and receivers (light sensors)) for optical communication towards end points (EP) EP1 to EP4 10, e.g., mobile user devices. Respective light beams generated by the TRXs 11 and defining coverage areas on the plane(s) of the EPs 10 are indicated by the dashed trapezoids in FIG. 1.

An AP 12 may apply a polling-based schedule for communicating with EP(s) 10 in its coverage area. Where the coverage areas of the TRXs 11 overlap (as shown for EP1 in FIG. 1), coordination of APs 12 is needed if the related TRXs 11 belong to different APs 12.

A LiFi controller 13 configured to manage the LiFi network is connected to the switch 14 and can provide such coordination for supporting interference handling and handover when one of the EPs 10 moves into and out of overlapping coverage areas of the APs 12. The controller 13 is connected via the switch 14 to the APs 12. The switch 14 may be connected to a synchronization server 16 for synchronization management and to a router 15 for connecting to a backplane or backhaul network (e.g. Ethernet) 100.

Figure 2:
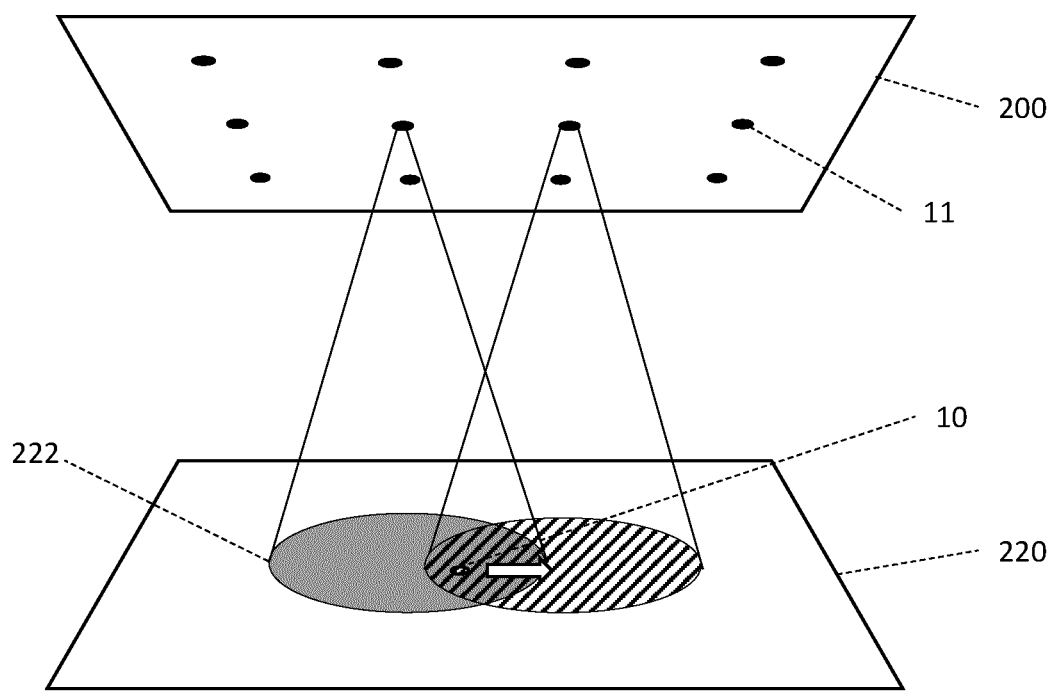
FIG. 2 shows schematically a LiFi infrastructure with overlapping coverage areas of neighboring access points, in which various embodiments can be implemented.

FIG. 2 shows schematically a LiFi infrastructure with first and second planar areas 200, 220, in which various embodiments can be implemented.

The LiFi infrastructure comprises a plurality of LiFi infrastructure TRXs 11 of respective APs (e.g. luminaires of a lighting system or alternatively standalone APs comprising one or more optical transceivers) located in a first planar area 200 (e.g. a ceiling wall in a building). Each of the LiFi infrastructure TRXs 11 has an optical coverage area for transmitting and receiving LiFi signals projected on a second planar area 220 (e.g. a ground floor of a building), of which two projections are shown in FIG. 2 as a hatched area and a grey area 222.

Furthermore, the LiFi infrastructure comprises an EP 10 located in the second planar area 220 and in the overlapping coverage area of two APs 12. The EP 10 moves in a direction indicated by the arrow.

In a deterministic scheduling approach (e.g. TDMA), the controller 13 may impose on the two APs 12 with the overlapping coverage area that each of them must restrict its communication to an assigned transmission channel. That means that a first one of the two APs 12 must restrict its communication with the EP 10 to a first transmission channel and the second one of the two APs 12 must restrict its communication with the EP 10 to a second transmission channel (in TDMA time-separated). This solution is not optimal for dense use of the network. To optimize performance, a set of more advanced rules for this situation can be that the first one of the APs 12 restricts communication with the EP 10 to the first transmission channel and the second one of the APs restricts communication with EP 10 by excluding the first transmission channel. However, still, time slots may be allocated although the EP has nothing to send or the EP 10 needs to wait until the start of its allocated time slot.

According to various embodiments, medium access is scheduled by a non-contention bandwidth assignment protocol, e.g. adaptive polling medium access control (APMAC) protocol. The APMAC protocol involves association, data transmission and dissociation phases. Moreover, the APMAC protocol exploits features of the IEEE 802.15.7 visible light communication (VLC) standard. While assigning bandwidth to the APs 12, the APs 12 may establish a polling table that contains the identity, buffer size and round-trip time of each EP 10 that issued bandwidth request. The contents of the polling table enable the computation of the maximum transmission unit and time slot for each EP 10 that requests bandwidth assignment.

With polling, an AP 12 can arrange an interval time for allocating a timeslot to an EP 10 more flexible. There is thus no need to calculate a complicated schedule based on a set of required interval times for the EPs 10. The AP 12 simply polls each EP 10, thereby dynamically adapting when it polls which EP 10 and for how long it allows the EP 10 to access when polled. The AP 12 can poll the EP 10 with a certain frequency depending on the latency requirement of the EP 10. If an EP 10 has no data to send, the AP 12 can immediately poll another EP 10.

To save power an EP 10 preferably only turns on its transmitter when it is polled. If it has no data to send, it may indicate that to the AP 12.

Normally, an AP 12 is continuously polling EPs 10, which means that it is not saving power on its transmission. If it would stop polling to save power, data may be waiting to be transmitted which may reduce the throughput, moreover latency requirements may be violated as well.

According to various embodiments, it is proposed that the AP 12 applies a polling scheme, but still can save power by using silent periods in which polling is not necessary.

To handle interference, the controller 13 may impose restrictions to the AP 12 as to when it may communicate with which EP 10 and when not. More specifically, the controller 13 may allocate predetermined time channels, which could be in the form of time-slots or time-intervals and may apply rules defining for which EPs 10 an AP 12 must restrict communication to the allocated time channel and for which EPs 10 an AP 12 must restrict communication by excluding a time channel allocated to a neighbor AP 12. Such restrictions need to be addressed for determining the silent period.

Figure 3:
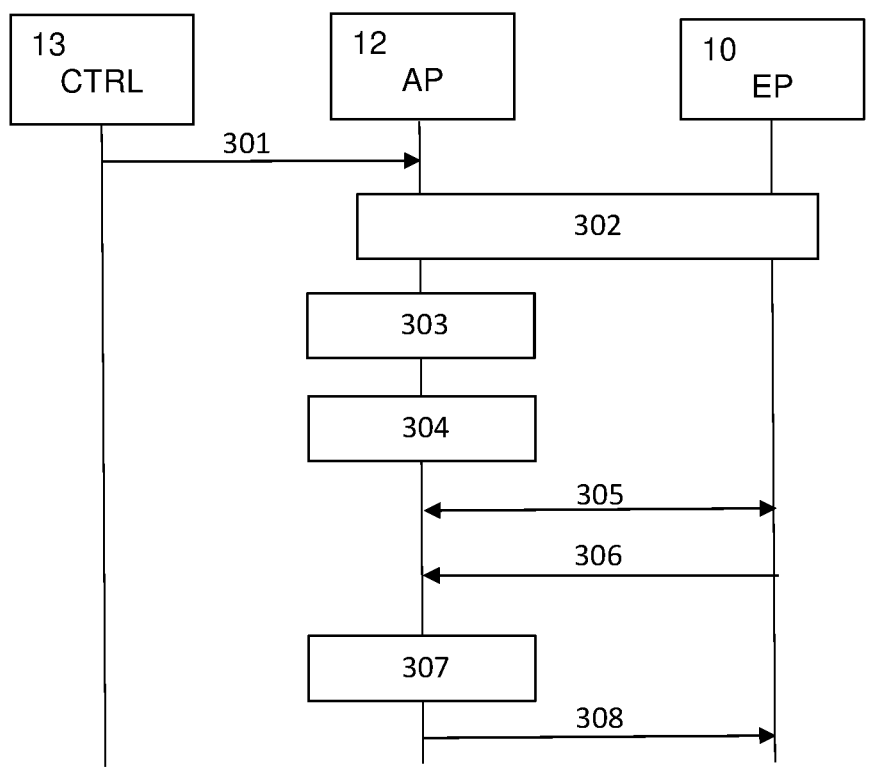
FIG. 3 shows schematically a signaling and processing sequence for power-efficient polling-based transmission in a LiFi network according to various embodiments.

FIG. 3 shows schematically a signaling and processing sequence for power-efficient polling-based transmission in a LiFi network according to various embodiments.

In the signaling and processing sequence of FIG. 3, the vertical direction from the top to the bottom corresponds to the time axis, so that messages or processing steps shown above other messages or processing steps occur at an earlier time.

As indicated in the top portion of FIG. 3, the processing times and messages occur at or between the LiFi controller (CTRL) 13, an AP 12 and an EP 10.

The AP 12 applies polling and may thereby keep an optimal throughput while fulfilling latency requirements.

The sequence may start with an optional restriction message from the controller 13 to the AP 12 indicating at least one communication restriction to be applied by the AP 12 (step 301). In an example, the controller 13 may indicate in the restriction message at least one specific time channel for communicating with EPs and/or restrictions on the AP 12 as to when it may communicate with which EP and when not.

The connection between EPs and APs can be initiated in an association phase by any of the two devices. When the AP 12 initiates communication, it sends a data transmission frame (not shown) directly to the EP 10. This is a point to point communication, so that there is no collision. However, when the EP 10 initiates communication, collision of access request frames from different EPs at the receiver (e.g. TRX 11) of the AP 12 may occur. Therefore, initially, the AP 12 may broadcast an availability data frame (not shown) to all EPs falling within its coverage area. The availability data frame may contain several parameters such as channel frequency and physical address of the AP 12. Furthermore, a buffer size and a destination physical address may optionally be included in case the AP 12 has some data to transmit to a particular EP. After receiving the availability data frame, the EP 10 within the coverage area of the AP 12 may respond by transmitting an access request frame (not shown) to the AP 12 wherein it requests access to use the shared channel for data transmission. Within the access request frame, several parameters may be included such as the physical address of the EP 10 and its buffer size.

In step 302, the EP 10 negotiates a polling interval (e.g. a maximum polling interval) with the AP 12 based on its required latency. In an example, individual polling intervals may be negotiated per priority for different communication priority levels (e.g. based on a required quality of service (QoS), latency, lifetime etc.).

Then, in step 303, the AP 12 determines a polling scheduling, e.g., based on a round robin algorithm where time slices are assigned to each polling process in equal portions and in circular order. Instead of round robin, the AP 12 may apply a selection of the next EP to poll, e.g. based on a negotiated polling interval and a last time served per EP.

The AP 12 may create a polling table that contains e.g. physical addresses, buffer sizes and round trip times (RTT, e.g. length of time it takes for a signal to be sent plus the length of time it takes for an acknowledgment of that signal to be received) of each EP that issued an access request frame. In an example, the estimation of the RTT may be done by considering the time taken from broadcasting the availability data frame until when the access request frame is received at the AP 12.

Thereafter, in step 304, the AP 12 determines a time to serve for each requesting EP depending on the queue length of data available for transmission at each EP, thereby balancing the queue length to find a satisfactory throughput and fairness, what is satisfactory can be based on requirements as regards throughput and/or fairness and/or relative weights so as to enable optimization.

Then, in step 305, a data exchange between the AP 12 and the EP 10 is initiated during the negotiated polling interval. To achieve this, the AP 12 may transmit to each concerned EP in the coverage area an access grant frame that specifies several parameters such as a transmission slot, a maximum transmission unit and a direction of data transfer (i.e., transmission or reception). If the direction parameter implies transmission, then the AP 12 should transmit, otherwise it should receive. The size of the maximum transmission unit may be dynamically adjusted depending on the current content of the polling table. The transmission time slot available for each EP may be obtained by adding the RTT and a processing time. After each consecutive data transmission time slot, a guard time may be added in order to avoid signal interference In step 306, at the end of the polling interval, the EP 10 informs the AP 12 about its remaining transmission queue length or a non-empty transmission queue at end of data exchange sequence. In an example, the EP 10 may notify a remaining transmission queue length for each of the plurality priority levels indicated above.

For power-saving purposes, the AP 12 determines and applies in step 307 a silent period in which no transmission takes place, when it has determined that all transmission queues of EPs are empty and thus no access request is pending.

In an example, the silent period may be determined by the AP 12 to be smaller than or equal to the smallest polling interval an EP associated to the AP 12 needs to be polled. The time Tp to be polled for an EP is the polling interval Ti minus the last polling time Tl for that EP, i.e.:

Tp=Ti−Tl.

Then in step 308, the AP 12 broadcasts a frame at the start of the silent period indicating the duration of the silent period.

To determine the duration of a silent period, the AP 12 may determine for each EP time Ts it may be silent by subtracting the next possible time Tn that an EP can be polled according to the restriction for this EP from the time Tp it needs to be polled. i.e.:

Ts=Tp−Tn.

In an example, the AP 12 may then determine the silent period to be smaller than or equal to the minimum of Ts for all associated EPs.

Figure 4:
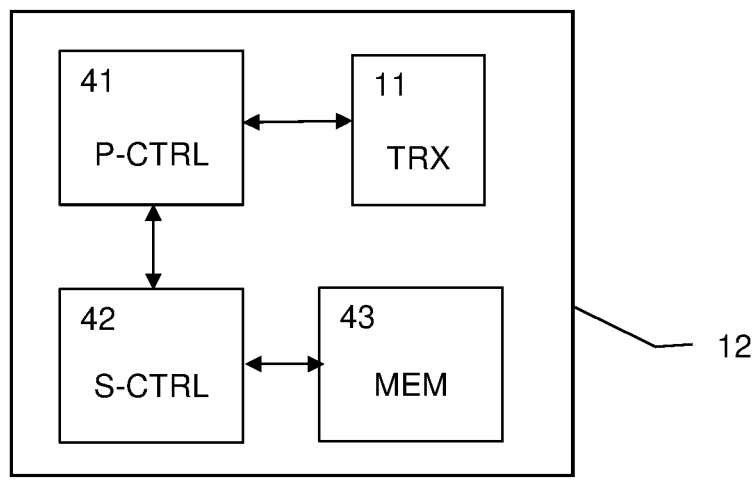
FIG. 4 shows schematically a block diagram of an access point according to various embodiments.

FIG. 4 shows schematically a block diagram of the AP 12 according to various embodiments.

The AP 12 comprises an optical transceiver (TRX) (i.e. a combined transmitter (optical emitters) and receiver (light sensors)) for optical communication (including IR and UV radiation) towards EPs, e.g., mobile user devices, under control of an integrated or separately arranged polling control processor (P-CTRL) 41, e.g. a software-controlled processing unit, to achieve the polling-based data exchange described in connection with FIGS. 3 and 5.

Furthermore, the AP 12 comprises silence control processor (S-CTRL) 42, e.g. a software-controlled processing unit or timer, which is used to determine and set the silent period described in connection with FIGS. 3 and 5. Information (e.g. polling table incl. e.g. polling interval, time of last poll, next polling opportunity etc. of associated EPs) required for determining the silent period may be stored in a memory (MEM) 43, e.g., as a look-up table.

The polling control processor 41 and the silence control processor 42 may be integrated in a single software-controlled processing unit which controls the polling operation and the silent period of the TRX 11 based on respective parameters (e.g. polling table, silence parameters etc.) received from EPs or determined at the AP 12.

Figure 5:
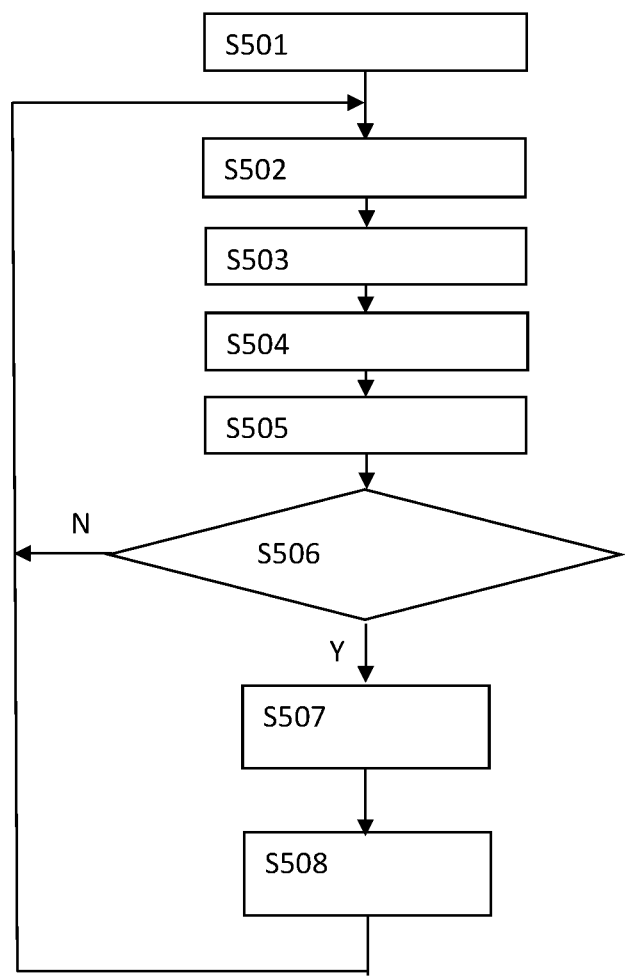
FIG. 5 shows a flow diagram of a power-efficient polling-based transmission procedure of a user device according to various embodiments.

FIG. 5 shows a flow diagram of a power-efficient polling-based transmission procedure of the AP 12 according to various embodiments. The steps of FIG. 5 may be implemented by respective software routines used to control the polling control processor 41 and the silence control processor 42, respectively.

In step S501, the AP 12 receives information about time channels allocated for data exchange with EPs and about restrictions concerning data exchange with individual EPs e.g. depending on interference situations or the like. Such information may originate from the central controller discussed earlier.

Then, in step S502, the AP 12 associates with an individual EP that requests an access and negotiates a polling interval for use in communication with this EP. Based thereon, the AP 12 updates its polling table.

In step S503, data is exchanged with the requesting EP during the negotiated polling interval. When the polling interval has expired, the AP 12 receives from the EP in step S504 an information about the remaining transmission queue length and updates its polling table.

Thereafter, in step 5505, the AP 12 updates its polling schedule and determines a new time to serve the EP in case it received information in step S504 indicating that the EP has still data for exchange in its transmission queue.

In the next step S506, the AP 12 checks whether all transmission queues of associated EPs are empty, i.e., no further EP waits for a new polling interval to exchange remaining data in is transmission queue. If not, the procedure jumps back to step S502 and polls a new EP for data exchange.

Otherwise, if the AP 12 determines in step S507 that all transmission queues of associated EPs are empty, it determines parameters for a new silent period, e.g., as explained above. Then, in step S508, at the start of the determined silent period, the AP 12 broadcasts a frame and optionally indicates the determined duration of the silent period in this frame. As an alternative, a fixed silent period may be used and repeated until the next EP needs to be polled.

During the silent period, the AP may turn off its transmitter (and even its receiver). Thereby, the AP may save significant power, because a silent period can repetitively occur. Additionally, the EPs may turn off their receiver (as they don't need to monitor for being polled) in the silent period.

To summarize, power saving can be achieved in an optical wireless communication (VLC/LiFi) system by using a polling-based medium access control (MAC) scheme, wherein an AP can use a silent period when no one is polled (and EPs may thus sleep). When transmission queues are empty, the access point may apply the silent period which may be based on a minimum polling interval announced by broadcast.

While the invention has been illustrated and described in detail in the drawings and foregoing description, such illustration and description are to be considered illustrative or exemplary and not restrictive. The invention is not limited to the disclosed OWC-based embodiments but may be applied to all kinds of networks with polling-based data exchange.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 3 and 5 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An access point for providing access to an optical wireless communication network, the access point configured to be coupled to one or more optical transceivers for communication with multiple associated end points, the access point comprising an apparatus for controlling communication in an optical wireless communication network via adaptive polling medium access control, wherein the apparatus is configured to:
    poll associated endpoints of the communication network for initiating a data exchange,
    receive from the associated endpoints information about a remaining transmission queue length at the end of the data exchange,
    determine a silent period to be smaller than or equal to a smallest polling interval of the associated endpoints, and
    apply the silent period in response to the status of transmission queues of associated endpoints.

2. The access point of claim 1, wherein a polling interval of a respective associated endpoint corresponds to a polling interval negotiated between the access point and the respective associated end point.

3. The access point of claim 1, wherein the apparatus is configured to receive a restriction message from a network controller indicating a specific time channel for communicating with the associated endpoints and/or a restriction as to when to communicate with which endpoint and when not.

4. The access point of claim 1, wherein the apparatus is configured to determine for each of the associated endpoints a silent time by subtracting a next possible time that the associated endpoint can be polled from a time it needs to be polled, wherein the time it needs to be polled corresponds to a negotiated polling interval minus the last polling time for the associated endpoint, and wherein the apparatus is configured to determine the silent period so as to be smaller than or equal to the minimum of the silent times for all associated endpoints.

5. The access point of claim 1, wherein the apparatus is configured to broadcast a frame at the start of the silent period indicating the duration of the silent period.

6. The access point of claim 1, wherein the apparatus is configured to determine a time to serve for each requesting endpoint depending on the transmission queue length of each associated endpoint.

7. The access point of claim 1, wherein the apparatus is configured to receive from the associated endpoints information about the remaining transmission queue length for each of a plurality of priority levels.

8. An access point assembly for providing access to an optical wireless communication system, the access point assembly comprising an access point as claimed in claim 1 and at least one optical transceiver coupled thereto to transmit an optical downlink communication signal and to receive an optical uplink communication signal.

9. An optical wireless communication system comprising an access point as claimed in claim 1 and at least one endpoint for communicating via adaptive polling medium access control.

10. The system of claim 9, wherein the endpoint is configured to turn on its transmitter when it is polled only.

11. The system of claim 9, wherein the endpoint is configured to negotiate a polling interval with the access point based on its required latency.

12. The system of claim 9, wherein the endpoint is configured to negotiate individual polling intervals per priority for different communication priority levels.

13. A method for an access point of controlling polling-based communication in an optical wireless communication network, the access point coupled to one or more optical transceivers for communication with multiple associated end points the method comprising:
    polling associated endpoints of the communication network to initiate a data exchange;
    receiving from the associated endpoints information indicating a remaining transmission queue length at the end of the data exchange;
    determine a silent period to be smaller than or equal to a smallest polling interval of the associated endpoints; and
    applying a silent period based on the status of transmission queues of associated endpoints.

14. A method of claim 13, wherein a smallest polling interval of a respective associated endpoint corresponds to a polling interval negotiated between the access point and the respective associated end point.

15. A non-transitory computer readable medium comprising instructions, the instructions when executed by a processor of an access point cause the processor to perform the method of claim 13.

* * * * *